US008190485B2

(12) United States Patent
Petersen

(10) Patent No.: US 8,190,485 B2
(45) Date of Patent: *May 29, 2012

(54) AUTOMATING THE PROCESS OF PURCHASING A MEMORY UPGRADE FOR A COMPUTER SYSTEM

(75) Inventor: Paul R. Petersen, Boise, ID (US)

(73) Assignee: Round Rock Research, LLC, Mount Kisco, NY (US)

( * ) Notice: Subject to any disclaimer, the term of this patent is extended or adjusted under 35 U.S.C. 154(b) by 886 days.

This patent is subject to a terminal disclaimer.

(21) Appl. No.: 11/879,417

(22) Filed: Jul. 16, 2007

(65) Prior Publication Data

US 2007/0265940 A1    Nov. 15, 2007

Related U.S. Application Data

(63) Continuation of application No. 09/733,372, filed on Dec. 8, 2000, now Pat. No. 7,251,618, which is a continuation-in-part of application No. 09/419,523, filed on Oct. 18, 1999, now abandoned.

(51) Int. Cl.
*G06Q 30/00* (2012.01)
(52) U.S. Cl. ............ 705/26.1; 705/28; 705/27; 717/173
(58) Field of Classification Search ...................... 705/26, 705/27, 28, 26.1; 717/173
See application file for complete search history.

(56) References Cited

U.S. PATENT DOCUMENTS

| | | | |
|---|---|---|---|
| 5,848,250 A | 12/1998 | Smith et al. | 710/300 |
| 5,950,220 A * | 9/1999 | Quach | 711/5 |
| 6,055,513 A | 4/2000 | Katz et al. | 705/26 |
| 6,094,702 A | 7/2000 | Williams et al. | 711/101 |
| 6,167,383 A | 12/2000 | Henson | 705/26 |
| 6,260,127 B1 | 7/2001 | Olarig et al. | 711/167 |
| 6,405,327 B1 | 6/2002 | Sipple et al. | 714/39 |
| 6,467,088 B1 * | 10/2002 | alSafadi et al. | 717/173 |
| 6,490,601 B1 | 12/2002 | Markus et al. | 715/507 |
| 2002/0184118 A1 * | 12/2002 | Gronemeyer et al. | 705/28 |

FOREIGN PATENT DOCUMENTS

EP    0 928 091 A2    7/1999

OTHER PUBLICATIONS

Steers, Kirk, "*RAM Upgrade Tips to Remember*", PC World Online, San Francisco, Jul. 1, 1999, p. 1.

* cited by examiner

*Primary Examiner* — Yogesh C Garg
(74) *Attorney, Agent, or Firm* — Gazdzinski & Associates, PC

(57) ABSTRACT

One embodiment of the present invention provides a system that facilitates purchasing a memory upgrade for a computer system. This system operates by obtaining memory configuration information for the computer system, and then determining a memory upgrade option based upon the memory configuration information. Next, the system presents an option to purchase the memory upgrade option to a user of the computer system. If the user indicates that the user would like to purchase the memory upgrade option, the system automatically initiates a purchase transaction for the memory upgrade option. In one embodiment of the present invention, the system automatically initiates the purchase transaction through a web site that facilitates purchasing the memory upgrade option. In a variation on this embodiment, the system automatically transfers at least part of the memory configuration information to the web site so that the user does not have to reenter details of the memory configuration information into the web site.

16 Claims, 3 Drawing Sheets

AUTOMATING THE PROCESS OF PURCHASING A MEMORY UPGRADE FOR A COMPUTER SYSTEM

RELATED APPLICATIONS

This application is a continuation of U.S. patent application Ser. No. 09/733,372, filed Dec. 8, 2000, now U.S. Pat. No. 7,251,618 which is a continuation-in-part of a U.S. patent application, entitled "Determining Memory Upgrade Options," by inventor Paul R. Petersen, Ser. No. 09/419,523, filed Oct. 18, 1999 now abandoned. This application hereby claims priority under 35 U.S.C. §120 to the above-listed patent application.

BACKGROUND

1. Field of the Invention

The present invention relates to the process of upgrading memory within a computer system. More specifically, the present invention relates to a method and an apparatus for automating the process of purchasing a memory upgrade for a computer system.

2. Related Art

As computational performance continues to increase at an exponential rate, computer systems only a few years old are often rendered obsolete because they lack the memory capacity required to accommodate the latest software. Instead of purchasing a new computer system, computer users typically upgrade their computer systems by purchasing additional memory modules to increase their computer systems' memory capacity.

Unfortunately, the process of purchasing a memory upgrade can be complicated. First, a computer user must typically deter-nine physical characteristics of the computer system in order to determine which memory modules to purchase. For example, the computer user may have to determine the amount of memory that is presently installed in the computer system, the maximum amount of memory that can be installed in the computer system, the number of free slots for memory modules in the computer system, and the type of memory that can be installed in the computer system (e.g., synchronous DRAM or double data rate DRAM).

Once the computer user has determined which types of memory modules will work in the computer system, the user must typically contact a vendor to determine which types of memory modules are available, and to obtain pricing information.

What is needed is a method and an apparatus for automating the process of purchasing a memory upgrade for a computer system.

SUMMARY

One embodiment of the present invention provides a system that facilitates purchasing a memory upgrade for a computer system. This system operates by obtaining memory configuration information for the computer system, and then determining a memory upgrade option based upon the memory configuration information. Next, the system presents an option to purchase the memory upgrade option to a user of the computer system. If the user indicates that the user would like to purchase the memory upgrade option the system automatically initiates a purchase transaction for the memory upgrade option.

In one embodiment of the present invention, the system automatically initiates the purchase transaction through a web site that facilitates purchasing the memory upgrade option. In a variation on this embodiment, the system automatically transfers at least part of the memory configuration information to the web site so that the user does not have to reenter details of the memory configuration information into the web site.

In one embodiment of the present invention, the system obtains the memory configuration information by reading serial presence detect information from a non-volatile storage device within a memory module in the computer system.

In one embodiment of the present invention, the system determines the memory upgrade by identifying a plurality of memory upgrade options that will work in the computer system based upon the memory configuration information. The system then allows the user to select the memory upgrade option from the plurality of memory upgrade options.

In one embodiment of the present invention, the memory configuration information includes at least one of: an amount of memory installed in the computer system; a maximum amount of memory that can be installed in the computer system; a number of memory module sockets that are available to accept memory modules in the computer system; and an operating speed for memory in the computer system.

In one embodiment of the present invention, prior to obtaining the memory configuration information, the system receives a command from the user to initiate a memory upgrade for the computer system.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer System

Figure 1:
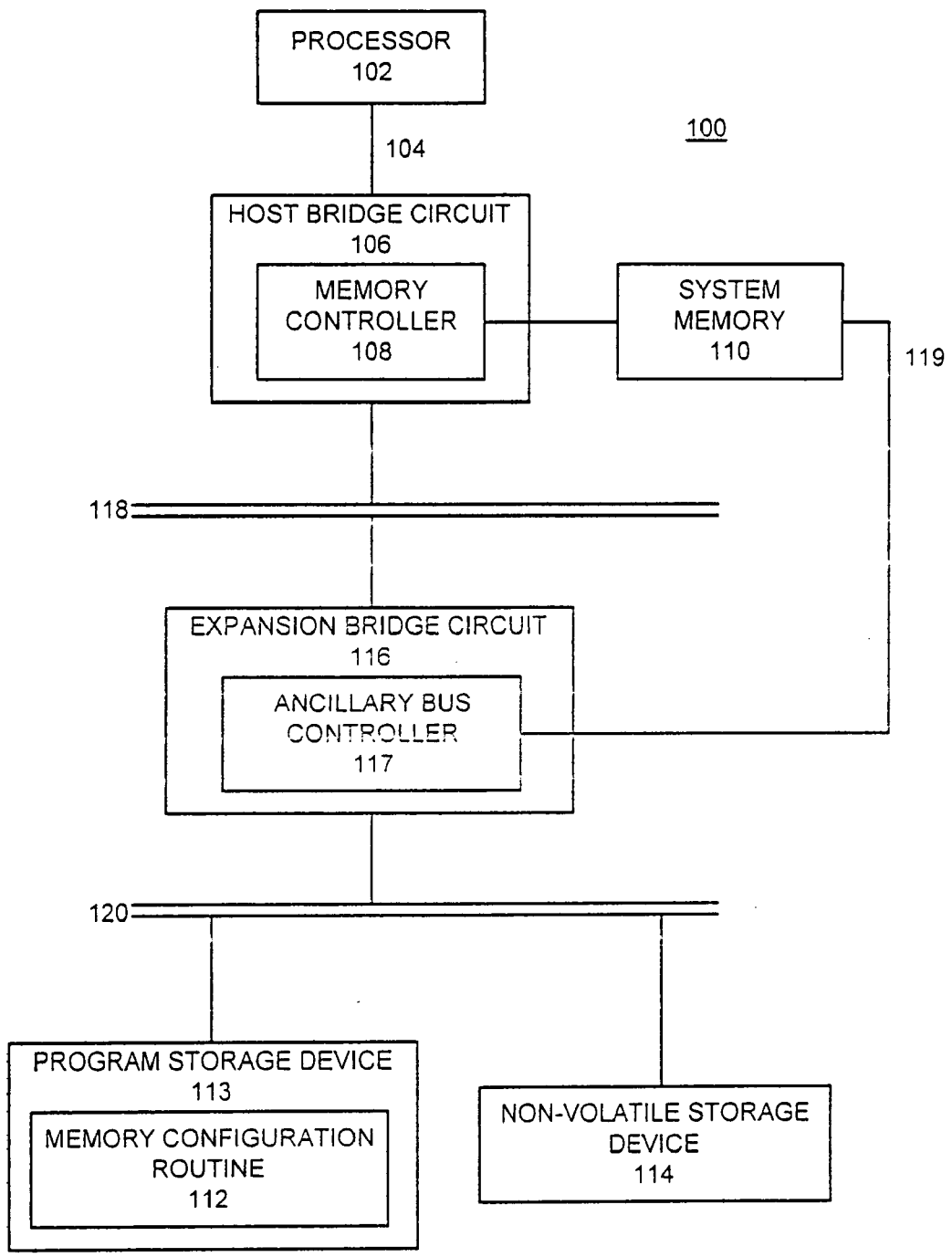
FIG. 1 illustrates a computer system including a memory configuration routine in accordance with an embodiment of the present invention.

Referring to FIG. 1, an illustrative computer system 100 in accordance with the present invention includes a memory configuration routine 112 to determine characteristics of system memory 110 and provide this information to a user in anticipation of a memory upgrade. The routine 112 determines the memory address characteristics of the system 100 (e.g. maximum address space of a processor/operating system and/or number of memory sockets available for connecting memory). The routine 112 also identifies a current memory configuration including the operational characteristics of installed memory. Using this combination of information, the routine 112 calculates a residual memory capacity and provides memory upgrade options to a user. Illustrative operational characteristics include, but are not limited to, the type of memory, the operating speed of the memory, the size or capacity of the memory, and the organization (i.e., bank layout) of the memory.

As illustrated in FIG. 1, the system 100 may also include a processor 102 coupled to a host bridge circuit 106 through a processor bus 104. The host bridge circuit 106 (such as the 82443BX Host-to-PCI bridge device from Intel Corporation) may facilitate communication between the processor 102 and various other system devices, including system memory 110. A memory controller 108 may be included in the host bridge circuit 106 to control access to the system memory 110. When the processor 102 or another device of the system 100 requires access to the system memory 110, the memory controller 108 must be activated.

The host bridge circuit 106 may be coupled to a primary bus 118, which operates in conformance with, for example, the Peripheral Component Interconnect (PCI) standard. An expansion bridge circuit 116, (such as the 82371AB PIIX4 IDE controller from Intel Corporation) allows communication between the primary bus 113 and a secondary bus 120. The secondary bus 120 may be operated in conformance with the Industry Standard Architecture (ISA), Extended Industry Standard Architecture (EISA), or the Low Pin Count (LPC) standards.

An ancillary bus controller 117 provides a communication interface for retrieval of configuration information from system memory over an ancillary bus 119. Illustrative ancillary buses include those operated in conformance with the System Management Bus (sponsored by Intel Corporation) or the I2C bus (sponsored by Philips Semiconductors). In one embodiment of the invention, the ancillary bus controller 117 may be incorporated within the expansion bridge circuit 116 as shown in FIG. 1. In another embodiment, the ancillary bus controller 117 may be incorporated in the host bridge circuit 106. In yet another embodiment, the ancillary bus controller 117 may be incorporated in a stand-alone device coupled to primary bus 118 or secondary bus 120.

System Memory

Figure 2:
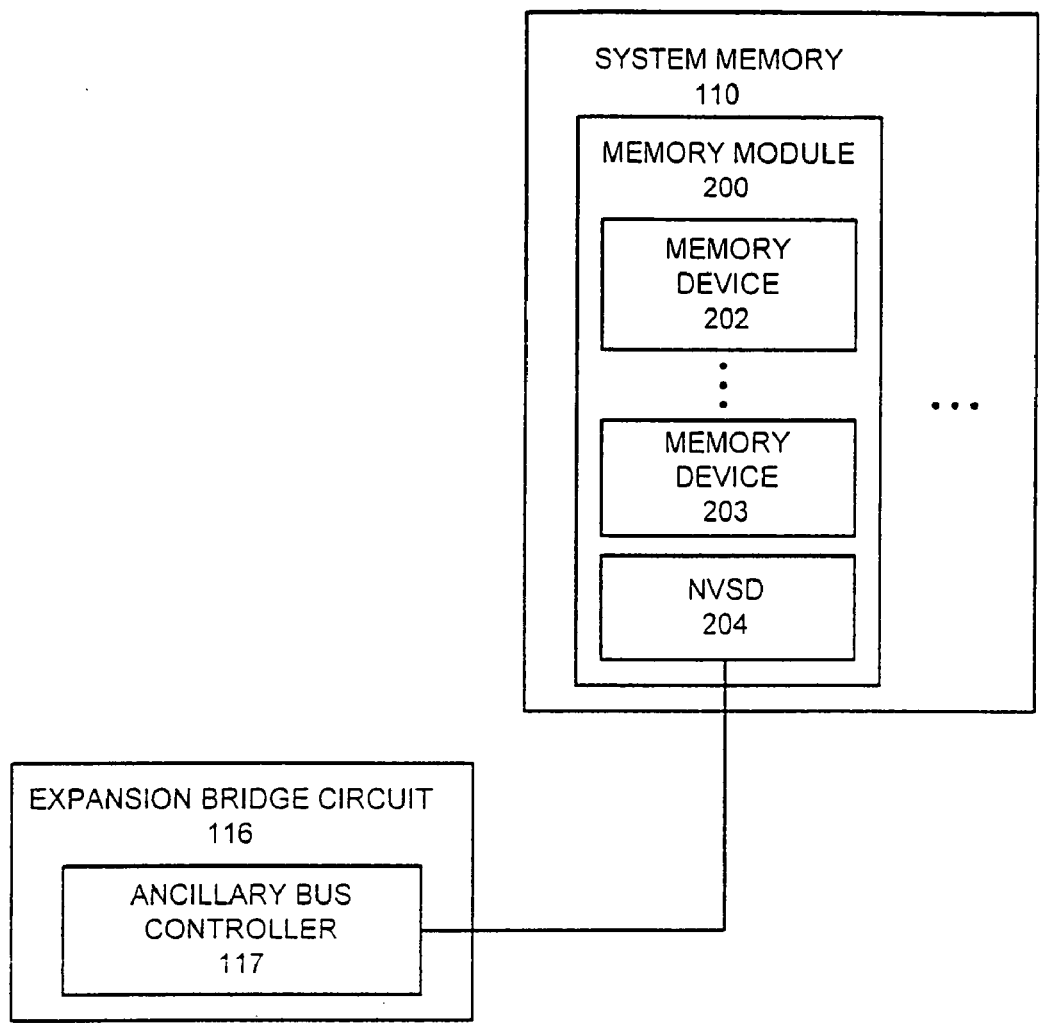
FIG. 2 illustrates an ancillary bus that communicates with system memory in accordance with an embodiment of the present invention.

Referring to FIG. 2, the system memory 110 may include one or more memory modules 200, each having multiple dynamic random access memory (DRAM) devices 202 and a non-volatile storage device (NVSD) 204, such as a serial presence detect (SPD) device. A memory module 200 may be a detachable device that is coupled to the system 100 through sockets, which are coupled to the memory controller 110. Memory devices 202 may be arranged on the memory module 200 to provide random access memory (RAM) storage for the processor 102 and other devices of the system 100. The memory devices 202 may be any type of DRAM such as fast page mode (FPM) DRAM, extended data out (EDO) DRAM, synchronous DRAM (SDRAM), double data rate (DDR) DRAM, Synchlink DRAM (SLDRAM), or RAMBUS® DRAM (RDRAM). The non-volatile storage device 204 located on each memory module 200 may be any type of non-volatile storage, such as erasable programmable read only memory (EPROM) or electrically erasable programmable read only memo (EEPROM) that stores information about the type and operating characteristics of the memory on the module 200. Such operational characteristics include information about the memory devices' 202-203 speed, the total amount of memory on the memory module 200, the organization of the memory (e.g., number and size of banks) and manufacturer identification data. The ancillary bus controller 117 may query the non-volatile storage device 204 of each memory module 200 via the ancillary bus 119 to retrieve memory configuration data to be used by the memory configuration routine 112 in determining memory upgrade options.

Referring again to FIG. 1, the memory configuration routine 112 may be stored as an executable code segment on a program storage device 113. The device 113 may include any suitable storage media such as a magnetic hard or floppy disk drive, an optical disk drive or boot read-only memory (ROM). The memory configuration routine 112 may be provided by an original equipment manufacturer (OEM) as a utility or application that may be accessed in the same manner as conventional applications. For example, a user may launch the memory configuration routine 112 by selecting an icon or by entering text at a command prompt.

Process of Obtaining Memory Configuration Data

Figure 3:
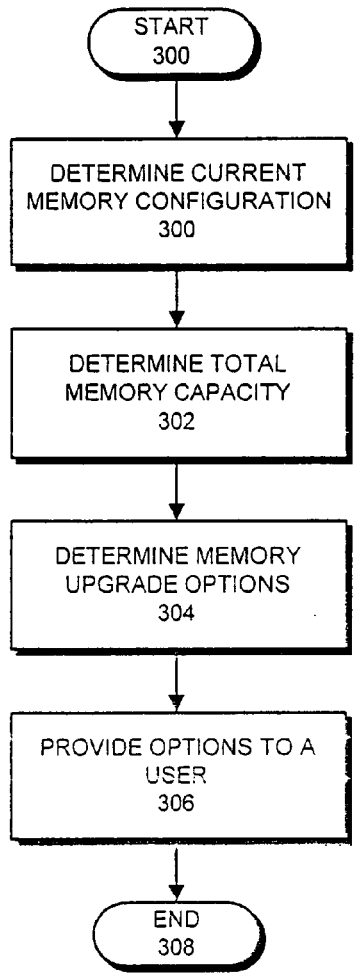
FIG. 3 is a flow chart illustrating the process of determining a memory upgrade option in accordance with an embodiment of the present invention.

Referring to FIG. 3, the memory configuration routine 112 obtains configuration data such the type, amount and operating characteristics of memory present in system memory 110 (block 300). In one embodiment, the routine 112 may use the ancillary bus controller 117 to retrieve configuration data for currently installed memory modules 200 by querying each module's non-volatile storage device 204. In another embodiment, configuration data for each memory module 200 may stored in a non-volatile storage device 114 (see FIG. 1) when memory controller 110 is initialized during power on self-test (POST) operations. Configuration data so stored may be retrieved by the routine 112. In yet another embodiment, the memory configuration routine 112 may retrieve memory configuration data form configuration registers internal to or associated with the memory controller 110 (not shown in FIG. 1).

As shown in block 302, the memory configuration routine 112 also determines a total memory capacity for the system 100 by identifying the number of memory module sockets available and/or the number of address lines utilized by the memory controller 108. In one embodiment, basic input/output system (BIOS) routines may be used to acquire information regarding total memory capacity. Alternatively, this information may be readily available on a non-volatile storage device such as device 114 (see FIG. 1).

In determining the total memory capacity, the memory configuration routine 112 may also account for limitations of a specific memory type already in use in the system 100. Configuration data from non-volatile storage device 204 may be utilized to determine constraints for a particular type of memory device 202. For example, if the system memory 110 comprises RAMBUS® devices, there is a limit of 32 devices per memory channel (i.e., memory devices 202). An additional limitation is that a RAMBUS® memory controller 108 may only support three memory module sockets. (A RAMBUS® technology overview may be obtained from Rambus, Inc. of California.) The precise constraints vary based on the type of memory device, but will be well known to those of ordinary skill in the art of computer system memory design.

After determining both the total memory capacity and the current memory configuration of the system 100, the memory configuration routine 112 determines memory upgrade options at block 304. For example, by contrasting the current memory configuration with the total memory capacity, the routine 112 may determine a residual memory capacity. The routine 112 may determine options to upgrade memory by adding memory modules of the same or a compatible memory type up to the limits of the residual memory capacity. The memory configuration routine 112 may also determine options to replace existing memory modules 200 with other types of memory or with memory modules having a greater amount of memory. The options established by the routine 112 may be based on specifications of memory modules currently available through memory manufacturers. This information may be stored on the non-volatile storage device 204 or in one or more data files accessible to routine 112. Alternatively, or in addition, this information may be obtained by routine 112 via an internet connection (directly or via modem).

Each of the possible upgrade options may be provided to a user, as shown at block 306, using any available output method such as a text listing of the options or a dialog box with upgrade information. In accordance with another embodiment, a user may be provided with an interactive interface to the memory configuration routine 112 wherein the user may be given the opportunity to select an indication of a particular memory module as an upgrade option. In response, the routine 112 may calculate new upgrade options or memory replacement options based on the user's selections. In this and similar embodiments, a user may explore many upgrade options and make an informed decision when upgrading system memory.

Process of Automatically Initiating a Purchase Transaction

Figure 4:
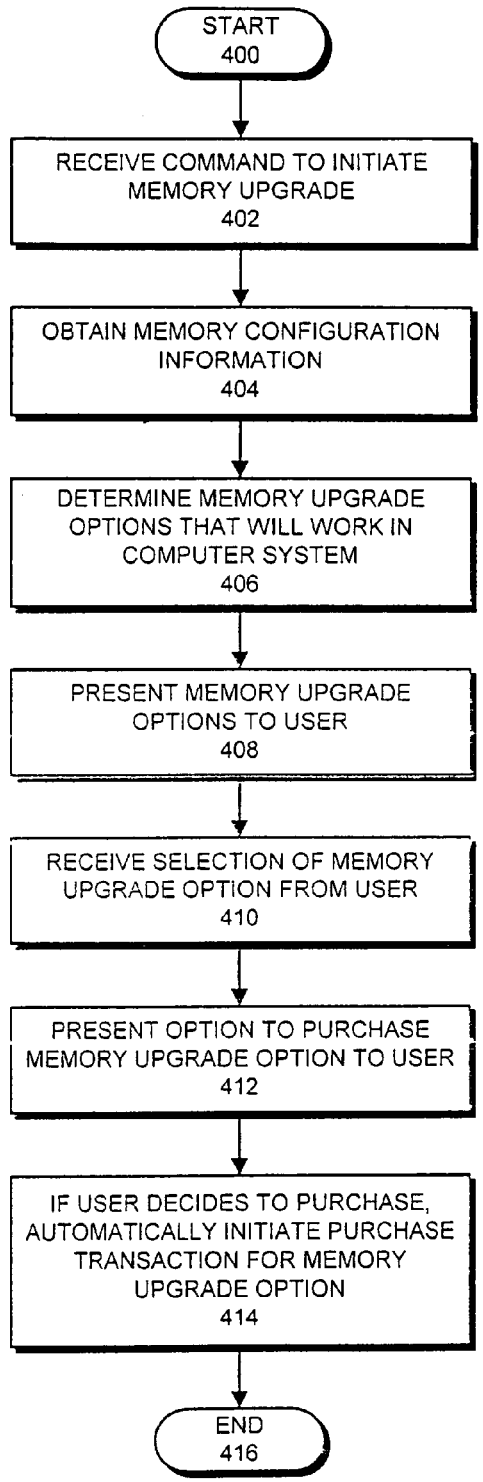
FIG. 4 is a flow chart illustrating the process of automatically initiating a purchase transaction for a memory upgrade in accordance with an embodiment of the present invention.

FIG. 4 is a flow chart illustrating the process of automatically initiating a purchase transaction for a memory upgrade in accordance with an embodiment of the present invention. The system starts by receiving a command to initiate the memory upgrade operation (block 402). Note that this command can be triggered in a number of ways; for example, by a user clicking on an icon in a graphical user interface of a computer system.

Next, the system determines memory configuration information for the computer system as is described above with reference to block 300 in FIG. 3 (block 404). Using this configuration information, the system determines memory upgrade options that that will work in the computer system as is described above with reference to block 304 of FIG. 3 (block 406).

The system next presents the possible memory upgrade options to the user as is described above with reference to block 306 of FIG. 3 (block 408). Next, the system receives a selection of a memory upgrade option from the user (block 410).

The system then presents the user with an option to purchase the selected memory upgrade option (block 412). If the user indicates that the user would like to purchase the memory upgrade option, the system automatically initiates the purchase transaction (block 414). For example, initiating the purchase transaction may involve directing a web browser on the computer system to a web site of a vendor of memory modules, and then navigating a web page within the web site that deals with purchasing memory modules. It may also involve communicating the memory configuration information to the web site so that the user does not have to re-enter this information.

In this way, a user is able to purchase a memory upgrade without having to worry about memory configuration information, and without having to worry about going to a store or navigating to a web site in order to purchase the memory upgrade.

Note that most of the actions illustrated in FIG. 4 may be carried out either by software that is located on a local computer system, or alternatively by software that is located on a remote server computer system, such as a server for a web site.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. For example, the acts of blocks 300 and 302 in FIG. 3 may be performed in reverse order (i.e., 302 followed by 300).

Additionally, the above disclosure is not intended to limit the present invention. The scope of the present invention is defined by the appended claims.

What is claimed is:

1. A method of purchasing memory for a customer's computer system comprising:
   using a server to obtain memory configuration information for the computer system, the memory configuration information being obtained from the computer system without requiring that the memory configuration information be entered into the computer system by the user, the memory configuration information comprising the amount of memory installed in the computer system, the number of memory module sockets that are available to accept memory modules in the computer system and an operating speed for the memory in the computer system;
   using the server to determine memory specification information for the computer system;
   using the server to determine memory upgrade options for the computer system based upon the memory configuration information and the memory specification information;
   using the server to present to the customer the memory upgrade options;
   allowing the customer to select at least one memory upgrade from the memory upgrade options;
   presenting an option for the customer to purchase the selected memory upgrade; and
   in response to the customer opting to purchase the selected memory upgrade, automatically initiating a purchase transaction for the selected memory upgrade.

2. The method of claim 1 wherein the server comprises a web site server.

3. The method of claim 2 wherein the server is in remote communication with the computer system.

4. The method of claim 3 wherein the server in remote communication with the computer system is in remote communication via the Internet.

5. The method of claim 4 wherein the memory specification information comprises the total memory capacity of the computer system.

6. The method of claim 5 wherein the server configured to present the memory upgrade options is further configured to present the memory upgrade options by transmitting the memory upgrade options to the computer system, the computer system configured to display the received memory upgrade options on a display within the computer system.

7. A method of purchasing memory for a customer's computer system comprising:
  using a server, in remote communication with the customer's computer system via an internet connection, to obtain memory configuration information for the customer's computer system, the memory configuration information comprising a type and amount of memory installed in the customer's computer system, wherein the memory configuration information is obtained without requiring that the memory configuration information be presented by the customer;
  using the server to determine memory specification information for the customer's computer system, wherein the memory specification information for the customer's computer system comprises a total memory capacity of the customer's computer system;
  using the server to determine memory upgrade options that are compatible with the customer's computer system based upon the memory configuration information and the memory specification information for the customer's computer system; and
  using the server to present to the customer a plurality of upgrade options, allowing the customer to explore and select a memory upgrade option, presenting an option for the customer to purchase the selected memory upgrade option to the customer's computer system, and initiating a purchase transaction for the selected memory upgrade.

8. The method of claim 7 wherein the server comprises a web site server.

9. The method of claim 8 wherein the memory configuration information further comprises at least one of:
  the number of memory module sockets that are in use in the computer system; and
  an operating speed for the memory in the computer system.

10. The method of claim 9 wherein the memory specification information further comprises the number of memory module sockets that are available to accept memory modules in the computer system.

11. A method of purchasing memory for a customer's computer system comprising:
  providing a memory configuration routine executable by a user's selection of an icon on a graphical user interface, the memory configuration routine, when executed, adapted to obtain memory configuration information for a computer system;
  receiving memory configuration information for the computer system via the execution of the memory configuration routine, the memory configuration information comprising the amount of memory installed in the computer system, the number of memory module sockets that are available to accept memory modules in the computer system and an operating speed for the memory in the computer system;
  using one or more servers to determine memory specification information for the computer system;
  determining memory upgrade options for the computer system based upon the memory configuration information and the memory specification information;
  presenting to the customer the memory upgrade options;
  receiving from the customer a request to purchase the selected memory upgrade option; and
  initiating a purchase transaction for the selected memory upgrade.

12. The method of claim 11 wherein the server is in remote communication with the computer system.

13. The method of claim 12 wherein the server in remote communication with the computer system is in remote communication via the Internet.

14. The method of claim 13 wherein the memory specification information comprises the total memory capacity of the computer system.

15. The method of claim 14 wherein the server configured to present the memory upgrade options is further configured to present the memory upgrade options by transmitting the memory upgrade options to the computer system, the computer system configured to display the received memory upgrade options on a display within the computer system.

16. The method of claim 15 further comprising:
  wherein the act of presenting to the customer the memory upgrade options further comprises transmitting the memory upgrade options to the computer system from the one or more servers.

* * * * *